United States Patent [19]

Schweizer

[11] Patent Number: 5,850,310
[45] Date of Patent: Dec. 15, 1998

[54] ZOOM DEVICE

[75] Inventor: Jürgen Schweizer, Westerhofen, Germany

[73] Assignee: Carl-Zeiss-Stiftung, Heidenheim, Germany

[21] Appl. No.: 722,872

[22] Filed: Sep. 26, 1996

[30] Foreign Application Priority Data

Sep. 27, 1995 [DE] Germany .................. 195 35 887.2

[51] Int. Cl.⁶ .......................... G02B 27/10; G02B 15/14
[52] U.S. Cl. .................... 359/622; 359/619; 359/621; 359/628; 359/623; 359/676
[58] Field of Search .................... 359/619, 621, 359/622, 623, 628, 676

[56] References Cited

U.S. PATENT DOCUMENTS

| | | |
|---|---|---|
| 4,617,578 | 10/1986 | Nezu et al. |
| 4,867,514 | 9/1989 | Waldron ........................... 359/619 |
| 5,170,277 | 12/1992 | Bard et al. |
| 5,270,859 | 12/1993 | Wirth et al. ....................... 359/622 |
| 5,392,157 | 2/1995 | Shih ................................... 359/625 |
| 5,581,408 | 12/1996 | Schumtz et al. ................. 359/622 |

FOREIGN PATENT DOCUMENTS

WO94/18582   8/1994   WIPO .

OTHER PUBLICATIONS

"Bauelemente der Optik" by H. Naumann et al, fourth edition, Carl Hanser Verlag, Munich, pp. 396 to 397, 27 Oct. 1983.

*Primary Examiner*—Georgia Y. Epps
*Assistant Examiner*—Evelyn A. Lester
*Attorney, Agent, or Firm*—Walter Ottesen

[57] ABSTRACT

The invention is directed to a zoom device which is built up of several lenses wherein at least one parallel entry beam is changed with respect to its diameter. The exit beam has the same optical axis as the entry beam. The zoom device of the invention is assembled from several zoom systems. The optical axes of the lenses of the different zoom systems are arranged so as to be mutually parallel or at least in a fixed spatial relationship so that in a beam made up of many individual beams the defined diameter remains constant because of the axes of the outer individual beams.

22 Claims, 5 Drawing Sheets

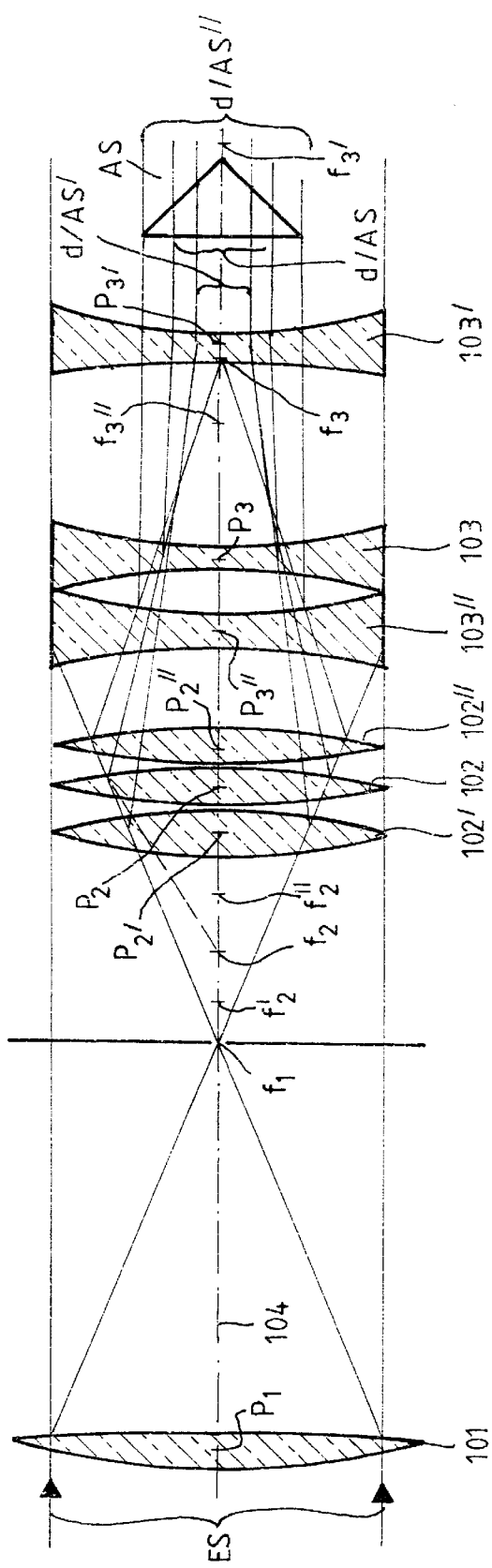

ZOOM DEVICE

FIELD OF THE INVENTION

The invention relates to a zoom device built up of several lenses. In this device, at least one parallel entry beam can be changed with respect to its diameter and the exit beam has the same optical axis as the entry beam.

BACKGROUND OF THE INVENTION

Zoom devices as such are known per se and are used in many devices. Zoom devices function to provide a continuous focal length change. They are often referred to as vario systems. The mathematical basis for vario systems is presented in the text entitled "Bauelemente der Optik" by H. Naumann and C. Schröder, fourth edition, Carl Hansen Verlag, Munich, starting at page 396.

U.S. Pat. No. 4,617,578 discloses a multi-beam zoom and focusing device,

U.S. Pat. No. 5,170,277 discloses a beam deflecting device wherein a lens is held on one or two piezo-electric bimorph elements, PCT patent publication WO 94/18582 (claiming priority of U.S. patent application Ser. No. 08/014,418, filed Feb. 5, 1993) discloses an optical array wherein a binary optic Is used, Here, many beams are used for scanning an object. The optic utilized generates a parallel beam having a small beam diameter from a parallel beam having a large beam diameter.

A brochure of the Teledyne grown Engineering (Cummings Research Park, 300 Sparkman Drive NW, P.O. Box 070007, Hundsville) discloses a lens array wherein a maximum array size of 110×110 and with lenses lying closely one next to the other (spacing between 1 $\mu$m and 10 $\mu$m) with a lens diameter of between 10 $\mu$m to 300 $\mu$m.

SUMMARY OF THE INVENTION

It is an object of the invention to provide a zoom device wherein one or more entry beams impinge upon the device, a defined number of exit beams are present or generated and a deliberate change of the diameter of the discrete exit beams is possible.

The zoom device of the invention receives an entry light beam and includes: a plurality of zoom systems for receiving the entry light beam as a corresponding plurality of discrete entry component beams having respective entry optical beam axes; each of the zoom systems having a plurality of lenses defining an optical zoom axis and being adapted to permit changing the diameter of the beam corresponding thereto so that the exit component beam has a diameter different from the entry component beam and so that the exit component beam has the same optical beam axis as the entry component beam and that the same optical beam axis is coincident with the optical zoom axis; the exit component beams defining an overall cross section having an outer periphery defined by a portion of the exit component beams and the optical axes of the portion of exit component beams being interconnected by an imaginary line enclosing the remaining ones of the component beams; and, the zoom systems being arranged so as to cause the optical zoom axes thereof to be fixed in space relative to each other and so as to cause the imaginary line to remain constant irrespective of the changes in the diameter of the component beams.

Several discrete individual beams impinge upon the device and these individual beams are essentially parallel to their optical axes and the individual beams have a spatially symmetrical alignment, for example, they are parallel to each other referred to the optical axes of the individual beams. If this is the case, then this spatial symmetrical alignment is maintained in accordance with the zoom device of the invention and only the diameter of the individual beams is changed.

It can also be stated that the diameter of the individual beams is constant for the incident individual beams and that, for spatially symmetrical beams, the aperture angle of the individual beams after leaving the beam generating device (for example, linear or areal laser diode array, linear or areal microlens array, linear or areal prism arrangement et cetera) is constant.

The device of the invention permits a change of the diameter of the individual beams without a change in the relationship of the optical axes of the individual beams to each other. The overall dimension of the individual beams taken as a group remains constant.

If only one parallel entry individual beam impinges on the device, then this individual beam is broken up into a defined number of exit beams which are parallel to each other. With this device, the diameter of the individual exit beams can be changed in a deliberate manner.

BRIEF DESCRIPTION OF THE DRAWINGS

The invention will now be described with reference to the drawings wherein:

FIG. 6b is a side elevation view of the zoom device of FIG. 6a; and,

FIG. 7 is a device for facilitating the explanation of the general zoom principle.

DESCRIPTION OF THE PREFERRED EMBODIMENTS OF THE INVENTION

Figure 1:
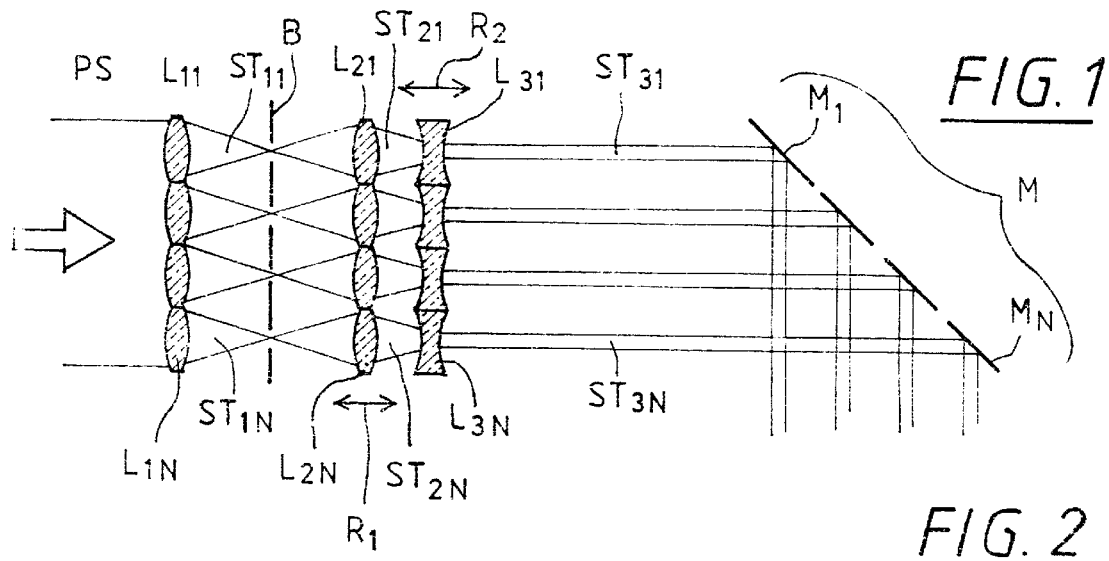
FIG. 1 is a schematic of a multi-beam zoom device having parallel entry beams and parallel exit beams.

The zoom device shown in FIG. 1 comprises a plurality of three-lens units ($L_{11}$, $L_{21}$, $L_{31}$; . . . ; $L_{1N}$, $L_{2N}$, $L_{3N}$) and each defines a zoom unit. The individual zoom units of the zoom device are arranged at least in a linear array and are preferably arranged in an areal array. Each two lenses ($L_{21}$, $L_{31}$; . . . ; $L_{2N}$, $L_{3N}$) of the individual three-lens units are movable in the optical axis of the incident beam PS with respect to their position to each other and in their position with respect to the third lens ($L_{11}$; $L_{1N}$).

The incident beam PS can be an individual beam ES or a multi-beam bundle MS. A multi-beam bundle MS is understood to mean in the following a bundle of generally identical and mutually separate individual beams having respective primary axes parallel to each other or at least arranged symmetrically with respect to each other in space.

Multi-beam bundles MS can be generated via several techniques of which two are mentioned below:

(1) by a dense packing of individual beam sources which are mounted linearly or areally with the beam sources comprising, for example, laser diodes; and, (2) by breaking down a compact large individual beam into many small beams via a device which comprises, for example, two microlens gratings.

If a variable beam diameter of the individual beams is desired, then this can be achieved primarily in that the total multi-beam bundle MS is transmitted through an optical zoom system according to the state of the art. This procedure, however, has the basic disadvantage that the outer diameter of the multi-beam bundle MS changes proportionally to the change of all individual beams. This means that the optical axes of the individual beams do not lie at a fixed spacing from the zoom device and instead are shifted. A further "processing" of the multi-beam bundle MS, for example, on an areally arranged scan mirror field is then only possible to a limited extent because the scan mirror field must actually also change geometrically in proportion.

For the above reason, it is desired that the spacing of parallel entry beams remains constant when passing through the zoom device and not to have the situation, as in the state of the art, wherein the spacings of the entry beams change proportionally to the diameter change of the individual beams rearward of the zoom device.

The incident beam bundle PS is subdivided by the areally arranged lenses ($L_{11}, \ldots, L_{1N}$) in a first lens array into individual discrete beam bundles ($ST_{11}, \ldots, ST_{1N}$) and is focused. In the specific example, a diaphragm B is disposed in the focus and the diaphragm always maintains the same spacing to the first lenses ($L_{11}, \ldots, L_{1N}$) of the zoom device in the beam path. This diaphragm B ensures a sharply framed imaging of the individual discrete beams ($ST_{11}, \ldots, ST_{1N}$) on a workpiece surface. Generally, the diaphragm B in the zoom device is not absolutely required.

After the discrete individual beam bundles ($ST_{11}, \ldots, ST_{1N}$) pass through the diaphragm B, they are each diffracted and focused by the second lenses ($L_{21}, \ldots, L_{2N}$) of the zoom device individually and independently of the other beams ($ST_{11}, \ldots, ST_{1N}$) in the beam path. The third lenses ($L_{31}, \ldots, L_{3N}$) of the zoom device are disposed in the beam path forward of the focus of the beams ($ST_{21}, \ldots, ST_{2N}$).

The third lenses ($L_{31}, \ldots, L_{3N}$) can, in principle, also be mounted after the focus of the respective beams ($ST_{21}, \ldots, ST_{2N}$). The beams ($ST_{31}, \ldots, ST_{3N}$) which exit from the zoom device are at least essentially parallel to each other and, in this specific example, impinge upon a deflecting mirror M. The deflecting mirror M can have at least one tilt mirror ($M_1, \ldots, M_N$) for each of the beams ($ST_{31}, \ldots, ST_{3N}$) which is to be reflected. The tilt mirror ($M_1, \ldots, M_N$) is movable in at least one axis and preferably in two axes.

Each of these tilt mirrors ($M_1, \ldots, M_N$) can deflect the beam ($ST_{31}, \ldots, ST_{3N}$) which impinges thereon to a specific portion of the workpiece surface which is intended to be worked (exposed or removed). Still further optical elements can be mounted in the beam path between the tilt mirror ($M_1, \ldots, M_N$). and the workpiece surface. These are not shown in the drawing for the sake of clarity.

It is known from the state of the art as to how the two lens pairs ($L_{21}, L_{31}; \ldots, L_{2N}, L_{3N}$) must be positioned with respect to each other so that the beams ($ST_{31}, \ldots, ST_{3N}$) can run parallel to each other when exiting. In this connection, reference can be made to the text entitled "Bauelemente der Optik" by H. Naumann and G. Schröder, fourth edition, Carl Hansen Verlag, Munich. In this text, it can be seen that the first two lenses ($L_{11}, \ldots, L_{1N}; L_{21}, \ldots, L_{2N}$) of the zoom device are normally positive lenses; whereas, the third lens ($L_{31}, \ldots, L_{3N}$) must then always be a negative lens.

The beam diameters of the individual beams ($ST_{31}, \ldots, ST_{3N}$) can all be changed simultaneously when the lenses ($L_{21}, \ldots, L_{2N}$ or $L_{31}, \ldots, L_{3N}$) of a lens array are all moved simultaneously.

Figure 6A:
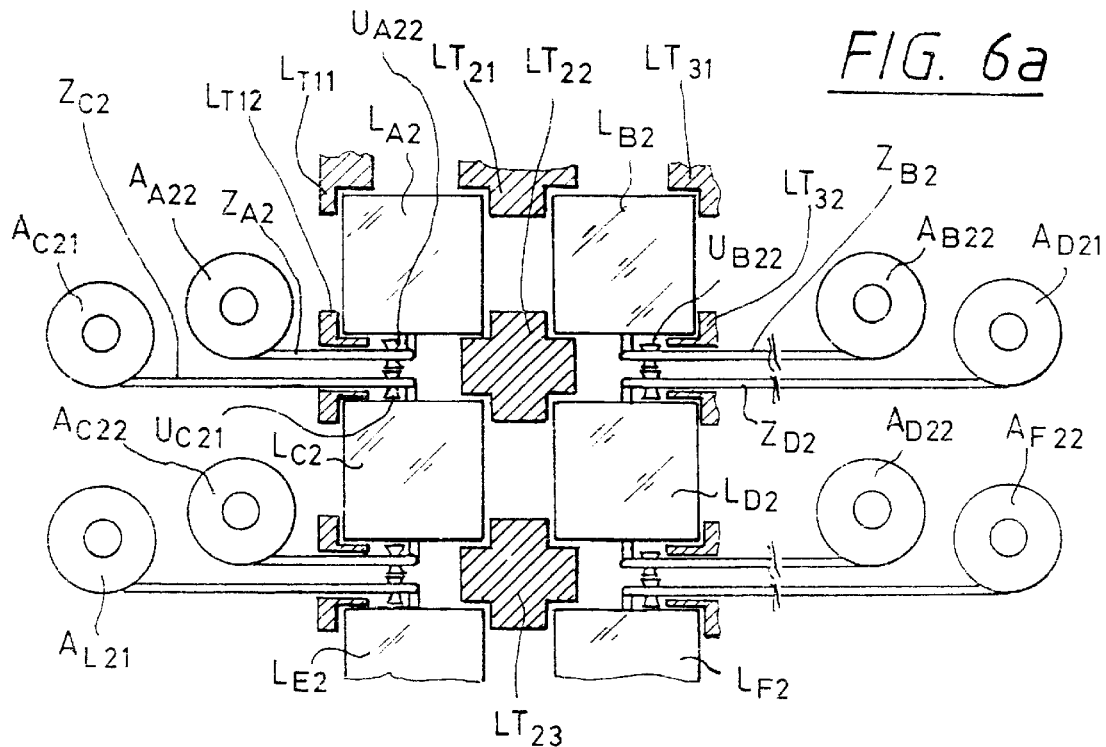
FIG. 6a is an embodiment of the zoom device according to the invention as seen in the viewing direction on the lenses.
Figure 6B:
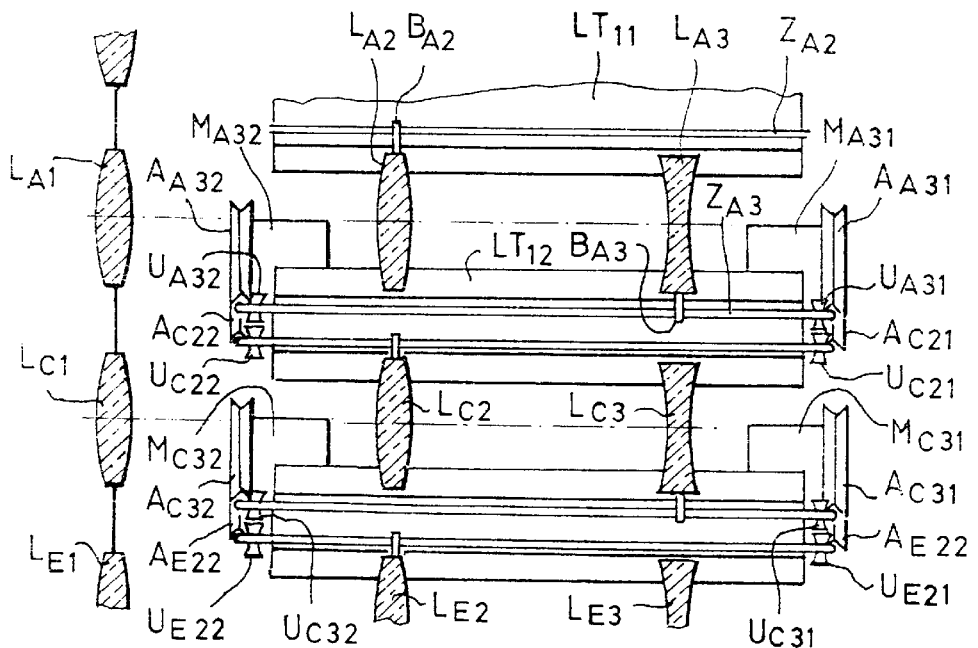

A discrete displacement unit can be provided for each individual lens ($L_{21}, \ldots, L_{2N}$ or $L_{31}, \ldots, L_{3N}$) so that the resulting beams ($ST_{31}, \ldots, ST_{3N}$), which impinge upon the workpiece surface, can each have different diameters. Such a unit is shown in FIGS. 6a and 6b. A zoom device having three different zoom ranges is explained with respect to FIG. 4.

Figure 2:
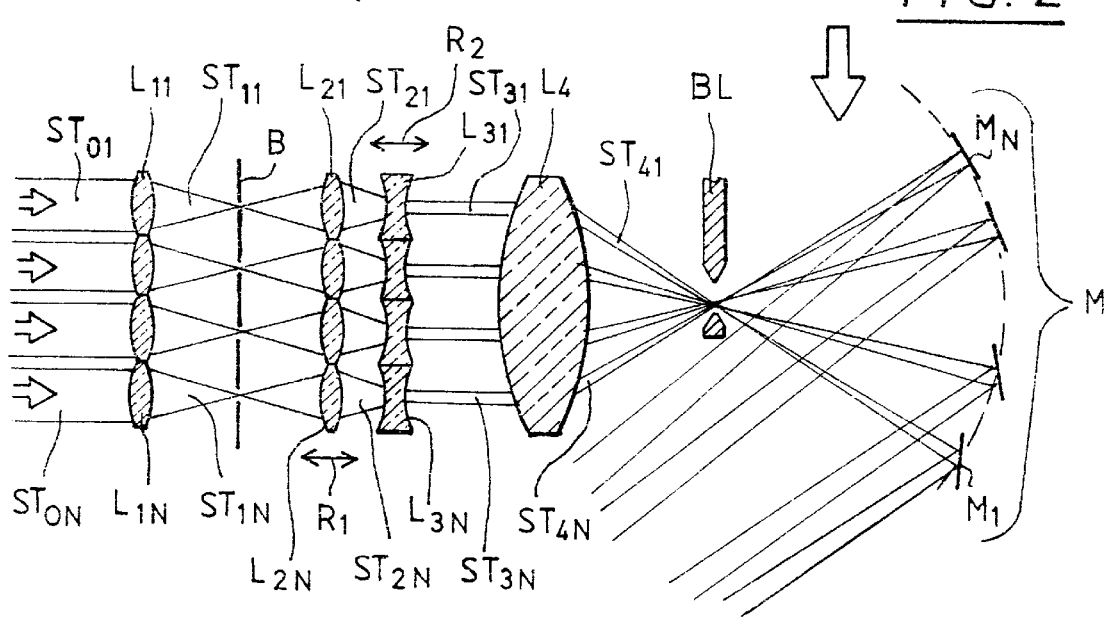
FIG. 2 is a schematic of a multi-beam zoom device having parallel entry beams and focused exit beams.

In FIG. 2, the device of FIG. 1 is shown again. Here, many discrete individual parallel beams ($ST_{01}, \ldots, ST_{0N}$) impinge upon the device.

The parallel beams ($ST_{01}, \ldots, ST_{0N}$) impinge upon the lenses ($L_{11}, \ldots, L_{1N}$) in the first lens array when entering the zoom device. These beams ($ST_{01}, \ldots, ST_{0N}$) are focused by the lenses ($L_{11}, \ldots, L_{1N}$). A diaphragm B is located in the focus. After passing through the diaphragm B, the beams ($ST_1, \ldots, ST_{1N}$) are diffracted by the lenses ($L_{21}, \ldots, L_{2N}$) in the second lens array and are focused. The lenses ($L_{31}, \ldots, L_{3N}$) of the third lens array are mounted forward of the focus. The lenses of the third lens array cause the incident beams ($ST_{21}, \ldots, ST_{2N}$) to become parallel to each other.

These mutually parallel beams ($ST_{31}, \ldots, ST_{3N}$) are incident upon an additionally arranged large fourth lens $L_4$ which focuses, in common, the beams ($ST_{41}, \ldots, ST_{4N}$) which exit from this lens.

A further diaphragm BL is mounted in the focus of the large lens $L_4$. After passing through this diaphragm BL, the discrete beams ($ST_{41}, \ldots, ST_{4N}$) impinge upon a deflecting mirror M which, however, no longer has a planar form. The deflecting mirror M comprises a plurality of tilt mirrors ($M_1, \ldots, M_N$) in the same manner as shown in FIG. 1. The individual tilt mirrors ($M_1, \ldots M_N$) can be tilted at least about one axis.

Each of the beams ($ST_{41}, \ldots, ST_{4N}$) coming from the zoom device impinges upon a discretely assigned tilt mirror ($M_1 \ldots, M_N$) so that each beam ($ST_{41}, \ldots, ST_{4N}$) is moved discretely on a workpiece surface continuously or in individual steps.

Figure 3:
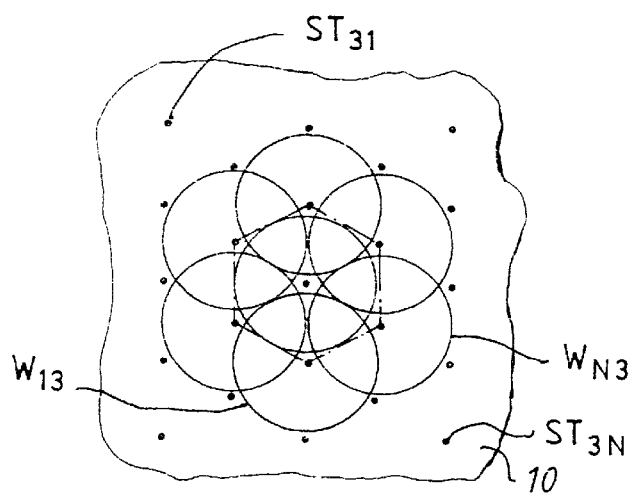
FIG. 3 shows a radiation pattern on the surface of a workpiece generated by the multi-beam zoom device of FIG. 1 or FIG. 2.

In FIG. 3, a workpiece surface 10 is shown which is to be machined by the beams ($ST_{31}, \ldots, ST_{3N}$). Each of the beams ($ST_{31}, \ldots, ST_{3N}$) can be moved essentially in the region ($W_{13}, \ldots, W_{N3}$) assigned thereto. Each of the two adjoining regions ($W_{13}, \ldots, WN_3$) overlap by a very small amount at all locations. The region covered in total by the entire region ($W_{13}, \ldots, WN_3$) on the workpiece surface 10 is so configured that, for each movement of the workpiece in a horizontal plane (radiation from the vertical direction), one or more additional total regions can be placed flush one next to the other and, in this way, a theoretically infinitely large workpiece surface 10 can be irradiated.

Figure 4:
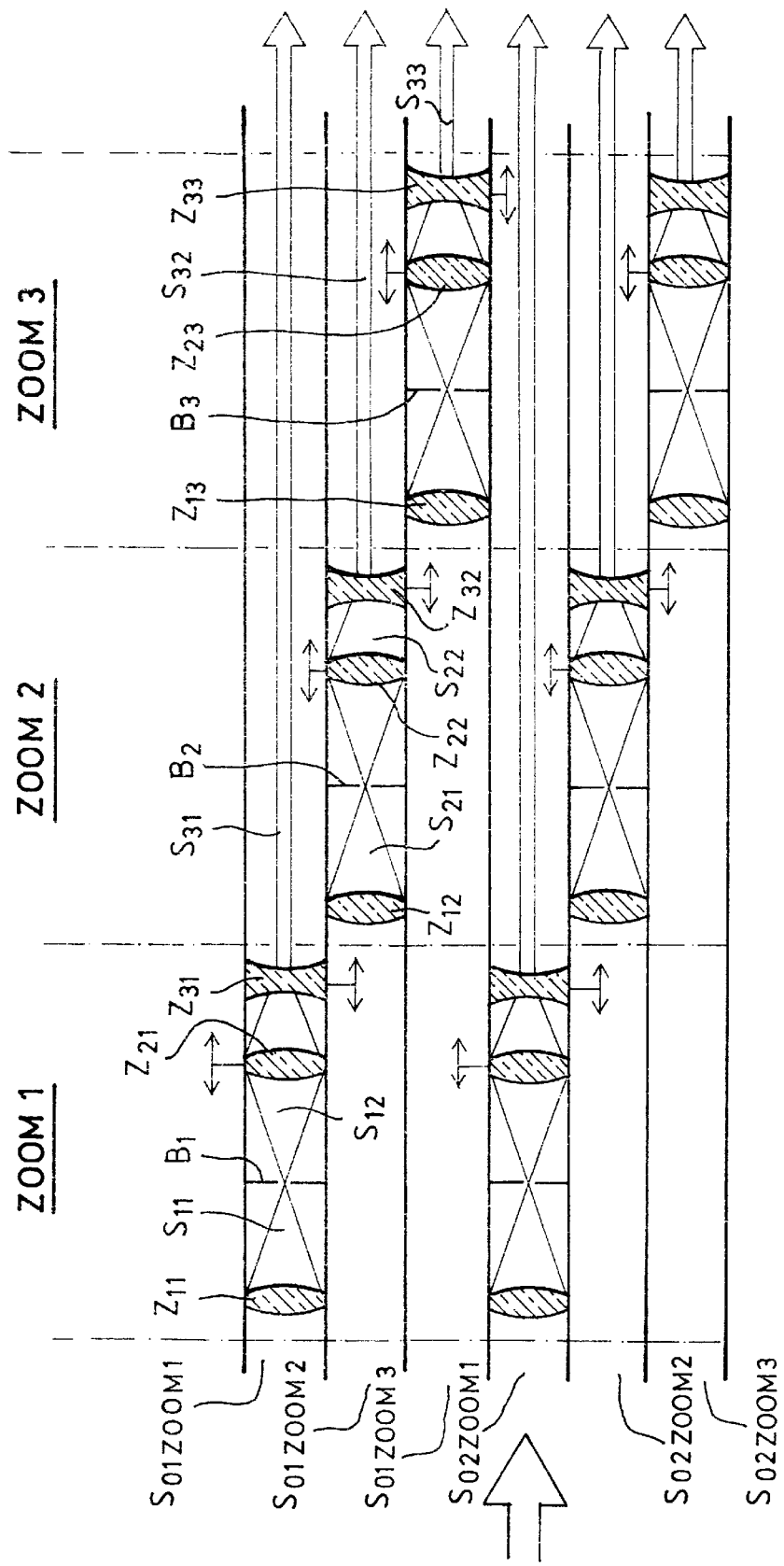
FIG. 4 is a schematic of a multi-beam zoom device having parallel entry beams and parallel exit beams.

In FIG. 4, a zoom device is shown with which three equal or different zoom ranges can be generated.

For the sake of clarity, only two of the zoom systems per group are shown. A great many more zoom systems can belong to one group and these zoom systems could be arranged in two dimensions.

In this embodiment, the different zoom systems are subdivided into three groups (zoom1, zoom2, zoom3). The second and third lenses ($Z_{21}, \ldots Z_{2N}; Z_{31}, \ldots, Z_{3N}$) of a group (zoom1, zoom2, zoom3) are all moved simultaneously. In contrast, the entry lenses ($Z_{11}, \ldots Z_{1N}$) and diaphragms ($B_1, \ldots, B_N$) maintain their positions for each zoom position.

The beams ($S_{01ZOOM1}, \ldots, S_{0NZOOM3}$) are parallel and incident upon the zoom device. These beams are focused by the first lenses ($Z_{11}, \ldots, Z_{1N}$), the beams ($S_{11}, \ldots, S_{N1}$) pass through a diaphragm ($B_1, \ldots, B_N$) and are diffracted by the second lenses ($Z_{21}, \ldots, Z_{2N}$). The third lenses ($Z_{31}, \ldots, Z_{3N}$) are disposed forward of the focus of the diffracted beams ($S_{11}, \ldots, S_{N1}$). The third lenses again convert the parallel beams ($S_{31}, \ldots, S_{3N}$) to parallel beams which have the same optical axes as the beams ($S_{01ZOOM1}, \ldots, S_{0NZOOM3}$) which incident upon the zoom device.

Figure 5C:
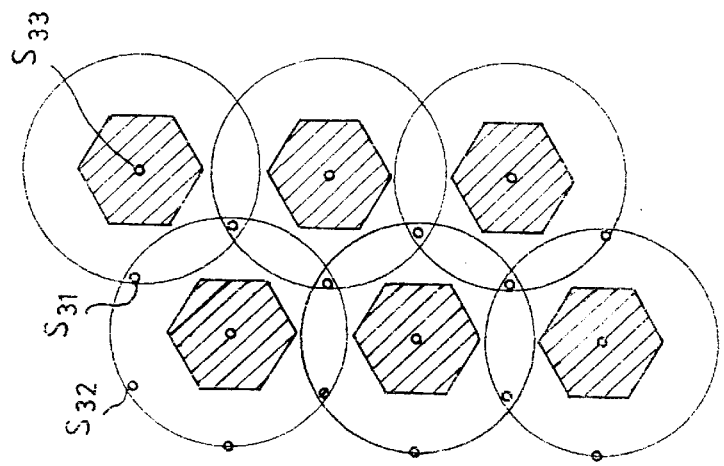
FIGS. 5a to 5c are respective views of a radiation pattern on the surface of a workpiece with the pattern being generated by the multi-beam zoom device of FIG. 1 or FIG. 2.
Figure 5B:
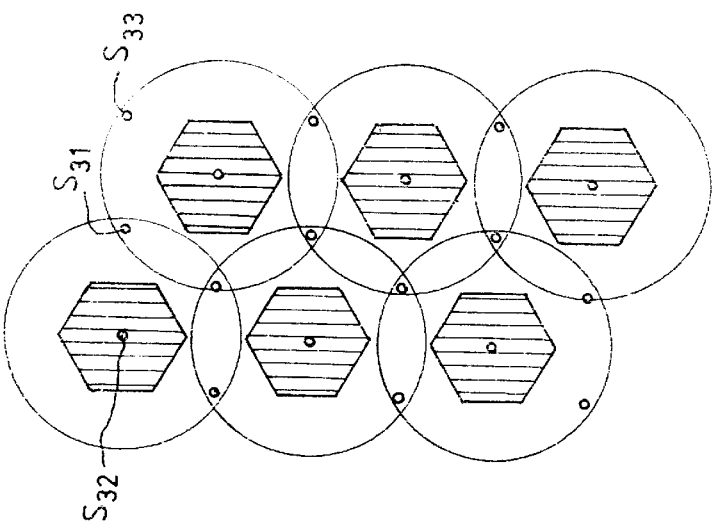
Figure 5A:
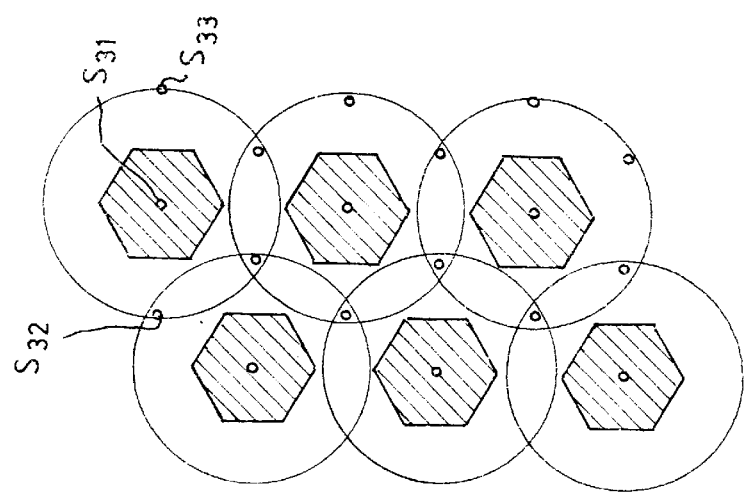

The discrete beams ($S_{31}, \ldots, S_{3N}$) are formed by the lenses ($Z_{11}, \ldots Z_{1N}$; $Z_{21}, \ldots, Z_{2N}$; $Z_{31}, \ldots Z_{3N}$). The workpiece surface is irradiated by each of these discrete beams and this is shown in FIGS. 5a to 5c. The workpiece surface is shown for each group of zoom systems (zoom1, zoom2, zoom3) of the zoom device in one figure. The beams ($S_{31}, \ldots, S_{3N}$) do not irradiate the entire surface of a hexagon simultaneously. The hexagons show only the movement space of a beam ($S_{31}, \ldots, S_{3N}$). A small overlapping area is there but not shown.

Either a large beam or a plurality of small beams ($S_{01ZOOM1}, \ldots, S_{0NZOOM3}$) can incident upon the zoom device in FIG. 4. The zoom device can be utilized as a beam splitter.

The portion of the large beam or the respective discrete beams ($S_{01ZOOM1}, \ldots, S_{0NZOOM1}$) incident upon the first zoom system (zoom1) is adapted with respect to its diameter to the desired diameter by the three lenses ($Z_{11}, \ldots, Z_{1N}$; $Z_{21}, \ldots Z_{2N}$; $Z_{31}, \ldots, Z_{3N}$) of the first zoom system (zoom1). The individual discrete beams ($S_{01ZOOM1}, \ldots, S_{0NZOOM1}$) (or the generated component beams of the large beam) are incident upon the zoom device and leave the zoom device as parallel beams ($S_{31}, \ldots, S_{3N}$).

Correspondingly, the part of the large beam or the respective discrete beams ($S_{01ZOOM2}, \ldots, S_{0NZOOM2}$), which are incident upon the second zoom system (zoom2), is adapted by the three lenses ($Z_{12}, \ldots, Z_{1N}$; $Z_{22}, \ldots, Z_{2N}$; $Z_{32}, \ldots, Z_{3N}$) of the second zoom system (zoom2) to the desired diameter and the individual discrete beams ($S_{01ZOOM2}, \ldots, S_{0NZOOM2}$) (or the generated component beams of the large beam) incident upon the zoom device leave as parallel beams ($S_{32}, \ldots, S_{3N}$).

The part of the large beam or the respective discrete beams ($S_{01ZOOM3}, \ldots, S_{0NZOOM3}$), which impinge upon the third zoom system (zoom3) is also adapted to the desired diameter by the three lenses ($Z_{13}, \ldots Z_{1N}$; $Z_{23}, \ldots, Z_{2N}$; $Z_{33}, \ldots, Z_{3N}$) and the individual discrete beams ($S_{01ZOOM3}, \ldots, S_{0NZOOM3}$)(or the generated component beams of the large beam), which are incident upon the zoom device, leave the zoom device as parallel beams ($S_{33}, \ldots, S_{3N}$).

The respective irradiated regions of the individual component beams ($S_{31}, \ldots, S_{3N}$) of a group (see FIGS. 5a to 5c) on the workpiece surface should overlap so that no space, which is not irradiated, is left between the component beams ($S_{31}, \ldots, S_{3N}$) of a group of zoom systems.

FIGS. 6a and 6b show, with respect an exemplary device, how the zoom device according to the invention can be realized with measures known from the state of the art.

The individual lenses (for example, $L_{A2}, L_{A3}$) of the zoom system of the zoom device can be displaced. In order to displace these individual lenses, each of the lenses ($L_{A2}, L_{A3}$) are attached to a pull line ($Z_{A2}, Z_{A3}$). The lenses ($L_{A2}, L_{A3}$) to be displaced are guided by intermediate supports ($LT_{11}, LT_{12}, LT_{21}, LT_{22}$) and this guidance must be as free of friction and as easy as possible.

The pull line ($Z_{A2}, Z_{A3}$) is guided over direction-changing rollers ($U_{A21}, U_{A22}$; $U_{A31}, U_{A32}$) at both ends to the particular roll-up device ($A_{A21}, A_{A22}$; $A_{A31}, A_{A32}$). The roll-up device, in turn, is connected to a motor ($M_{A21}, M_{A22}$; $M_{A31}, M_{A32}$). A slip clutch (not shown and known from the state of the art) is provided between a motor ($M_{A21}, M_{A22}$; $M_{A31}, M_{A32}$) and a roll-up device ($A_{A21}, A_{A22}$; $A_{A31}, A_{A32}$) so that during the operation of one motor ($M_{A21}, M_{A31}$) the other motor ($M_{A22}, M_{A32}$) does not apply too great a holding force.

If it is desired to change the diameter of a beam incident upon the lens $L_{A2}$ in FIG. 6b, then the roll-up device $A_{A21}$ is moved by the motor $M_{A21}$. In this way, the lens $L_{A2}$ is displaced by the pull line $Z_{A2}$ connected to this lens $L_{A2}$ in a direction parallel to the optical axis. The motor $M_{A21}$ pulls at the one end of the pull line $Z_{A2}$. The pull line $Z_{A2}$ is wound on the roll-up device $A_{A21}$ mounted on the motor $M_{A21}$. Since the motor $M_{A22}$ located at the other end has a slip clutch, the pull line $Z_{A2}$ can be unwound from the roll-up device $A_{A22}$. At the same time, the motor $M_{A31}$ moves the second movable lens $L_{A3}$ of the zoom system with the pull line $Z_{A3}$ connected to this lens $L_{A3}$ by the required amount in the optical axis. The motor MA31 pulls at the one end of the pull line $Z_{A3}$. The pull line $Z_{A3}$ is wound up on the roll-up device $A_{A31}$ on the motor $M_{A31}$. Since the motor $M_{A32}$ located at the other end has a slip clutch, the pull line $Z_{A3}$ can be unwound from the roll-up device $A_{A32}$ mounted on the motor $M_{A32}$.

The two motors (for example $M_{A21}, M_{A22}$) of a lens $L_{A2}$ can only be mounted to the particular lens $L_{A2}$ with difficulty in the zoom arrangement. For this reason, the particular pull line $Z_{A2}$ is guided by direction-changing rollers ($U_{A21}, U_{A22}$). This permits mounting the motors ($M_{A21}, M_{A22}$) laterally of the area lens arrays.

In lieu of two motors (for example $M_{A21}, M_{A22}$) per lens $L_{A2}$, the two motors $M_{A22}$ can also be replaced by a spring device (not shown) which has a sufficiently large spring force to return the particular lens $L_{A2}$ into a defined start position.

However, other embodiments are possible (such as utilizing very small miniature motors on the lenses which are driven by a toothed wheel and so move the lens) and are here not further described because they can be easily realized. It is only essential that for each of the two lenses of the three-lens system of a zoom system to be moved, a moving device is provided which makes possible a displacement of the lens along the particular optical axis in both directions.

In FIG. 7, the three-lens lens system is shown enlarged in order to explain generating the change of the beam cross section of an individual beam.

The entry beam ES is focused by the first lens 101 of the lens system. A diaphragm M is mounted in the focus $f_1$ of the first lens 101. When the second lens 102 is in the base position P2, the third lens 103 is in the position P3. The exit beam AS has then the diameter d/AS.

If the diameter d/AS is to be reduced, then the second lens 102 can be displaced into the position P2' and the third lens 103 can be displaced into the position P3'. The resulting diameter d/AS' of the output beam AS then becomes smaller.

If this diameter d/AS is to be increased, then the second lens 102 can be displaced into the position P2" and the third lens 103 can be displaced into the position P3". The resulting diameter d/AS" of the exiting beam AS is then greater.

In FIG. 7, the foci ($f_1$, $f_2$, $f_2'$, $f_2''$, $f_3$, $f_3'$, $f_3''$) of the individual lenses (101, 102, 103) are each shown with respect to their position (P1, P2, P2', P2", P3, P3', P3"). The displacement of the two movable lenses (102, 103) takes place along the optical axis 104. As can easily be seen, a parallel exit beam AS is generated from the parallel entry beam ES. The optical axis 104 of the beam is maintained.

The device according to the invention can be utilized especially with monochromatic and dichromatic beams because, especially for dichromatic beams, the chromatic aberration can be easily corrected by coating the lenses in accordance with the state of the art. The lenses can be spherical or aspherical and, with aspherical lenses, further imaging errors can be corrected.

Each zoom system known from the state of the art can be used as a zoom system for changing the beam diameter. The known zoom system should then be capable of being mounted linearly or areally to an array without the beam paths of the individual beams being disturbed. That is, the invention is not restricted to the example shown herein with three lenses and all zoom systems can be used wherein a parallel entry beam leaves the device as a parallel exit beam. The entry beam and exit beam have different beam cross sections.

The zoom device can comprise only two or even several hundred or even a thousand zoom systems depending upon the desired configuration of the device in which the zoom device is to be utilized.

It is understood that the foregoing description is that of the preferred embodiments of the invention and that various changes and modifications may be made thereto without departing from the spirit and scope of the invention as defined in the appended claims.

What is claimed is:

1. A zoom device upon which an entry light impinges, the zoom device comprising:

a plurality of zoom systems for receiving said entry light as a corresponding plurality of discrete entry component beams having respective entry optical beam axes and having respective diameters;

each of said zoom systems having a plurality of lenses defining an optical zoom axis and being adapted to permit changing the diameter of the component beam corresponding thereto so that the component beam has a diameter changeable relative to the diameter of the entry component beam when said component beam becomes an exit component beam upon leaving the zoom system corresponding thereto and so that the exit component beam is coaxial with the entry component beam;

the exit component beams of said zoom systems conjointly defining an overall cross section having an outer periphery defined by a portion of said exit component beams and the optical beam axes of each of said exit component beams of said portion of exit component beams being interconnected by an imaginary line enclosing the remaining ones of said exit component beams;

said zoom systems being arranged so as to cause the optical zoom axes thereof to be fixed in space relative to each other and so as to cause said imaginary line to remain constant irrespective of the changes in the diameter of said exit component beams;

said optical zoom axes being mutually parallel; and, said exit component beams being parallel to the optical axis of said entry light beam.

2. The zoom device of claim 1, each one of said zoom systems including a light entry lens for transmitting the entry component beam corresponding to said each one of said zoom systems.

3. A zoom device upon which an entry light impinges, the zoom device comprising:

a plurality of zoom systems for receiving said entry light as a corresponding plurality of discrete entry component beams having respective entry optical beam axes and having respective diameters;

each of said zoom systems having a plurality of lenses defining an optical zoom axis and being adapted to permit changing the diameter of the component beam corresponding thereto so that the component beam has a diameter changeable relative to the diameter of the entry component beam when said component beam becomes an exit component beam upon leaving the zoom system corresponding thereto and so that the exit component beam is coaxial with the entry component beam;

the exit component beams of said zoom system conjointly defining an overall cross section having an outer periphery defined by a portion of said exit component beams and said portion of exit component beams being interconnected by an imaginary line enclosing the remaining ones of said exit component beams;

said zoom systems being arranged so as to cause the optical zoom axes thereof to be fixed in space relative to each other and so as to cause said imaginary line to remain constant irrespective of the changes in the diameter of said exit component beams;

said optical zoom axes being mutually parallel;

the lenses of each one of said zoom systems including a light-entry lens, an intermediate lens and a light-exit lens; and, said light-entry lens and said intermediate lens being positive lenses and said light-exit lens being a negative lens;

said intermediate lens and said light-exit lens of each zoom system conjointly defining a lens pair whereby a plurality of lens pairs are formed in said zoom device; and, said lenses of selected ones of said lens pairs being movable relative to each other.

4. The zoom device of claim 3, each one of said zoom systems further including a diaphragm interposed between said light-entry lens and said intermediate lens.

5. The zoom device of claim 2, said zoom systems being arranged so as to cause said light-entry lenses to be arranged in a plane.

6. A zoom device upon which an entry light impinges, the zoom device comprising:

a plurality of zoom systems for receiving said entry light as a corresponding plurality of discrete entry component beams having respective entry optical beam axes and having respective diameters;

each of said zoom systems having a plurality of lenses defining an optical zoom axis and being adapted to permit changing the diameter of the component beam corresponding thereto so that the component beam has a diameter changeable relative to the diameter of the entry component beam when said component beam becomes an exit component beam upon leaving the zoom system corresponding thereto and so that the exit component beam is coaxial with the entry component beam;

the exit component beams of said zoom systems conjointly defining an overall cross section having an outer periphery defined by a portion of said exit component beams and the optical beam axes of each of said exit component beams of said portion of exit component beams being interconnected by an imaginary line enclosing the remaining ones of said exit component beams;

said zoom systems being arranged so as to cause the optical zoom axes thereof to be fixed in space relative to each other and so as to cause said imaginary line to remain constant irrespective of the changes in the diameter of said exit component beams;

said optical zoom axes being mutually parallel; and, a positive lens mounted downstream of said zoom systems.

7. The zoom device of claim 3, said lenses of all of said lens pairs being movable relative to each other.

8. A zoom device upon which an entry light impinges, the zoom device comprising;

a plurality of zoom systems for receiving said entry light beam as a corresponding plurality of discrete entry component beams having respective entry optical beam axes and having respective diameters;

each of said zoom systems having a plurality of lenses defining an optical zoom axis and being adapted to permit changing the diameter of the component beam corresponding thereto so that the component beam has a diameter changeable relative to the diameter of the entry component beam when said component beam becomes an exit component beam upon leaving the zoom system corresponding thereto and so that the exit component beam is coaxial with the entry component beam;

the exit component beams of said zoom systems conjointly defining an overall cross section having an outer periphery defined by a portion of said exit component beams and said portion of exit component beams being interconnected by an imaginary line enclosing the remaining ones of said exit component beams;

said zoom systems being arranged so as to cause the optical zoom axes thereof to be fixed in space relative to each other and so as to cause said imaginary line to remain constant irrespective of the chances in the diameter of said exit component beams;

said optical zoom axes being mutually parallel;

each one of said zoom systems including a light entry lens for transmitting the entry component beam corresponding to said each one of said zoom systems; and the light-entry lens of each of said zoom systems having a hexagonal periphery.

9. The zoom device of claim 2, the light-entry lenses of said zoom system being arranged in an array.

10. The zoom device of claim 9, said array being so configured that a further like array can be added at all sides.

11. A zoom device upon which an entry light impinges, the zoom device comprising:

plurality of zoom systems for receiving said entry light beam as a corresponding plurality of discrete entry component beams having respective entry optical beam axes and having respective diameters;

each of said zoom systems having a plurality of lenses defining an optical zoom axis and being adapted to permit changing the diameter of the component beam corresponding thereto so that the component beam has a diameter changeable relative to the diameter of the entry component beam when said component beam becomes an exit component beam upon leaving the zoom System corresponding thereto and so that the exit component beam is coaxial with the entry component beat;

the exit component beams of said zoom systems conjointly defining an overall cross section having an outer periphery defined by a portion of said exit component beams and said portion of exit component beams being interconnected by an imaginary line enclosing the remaining ones of said exit component beams;

said zoom systems being arranged so as to cause the optical zoom axes thereof to be fixed in space relative to each other and so as to cause said imaginary line to remain constant irrespective of the changes in the diameter of said exit component beams;

said optical zoom axes being mutually parallel;

each one of said zoom systems including a light entry lens for transmitting the entry component beam corresponding to said each one of said zoom systems;

the light-entry lenses of said zoom system being arranged in an array; and, said array being built up of a hexagonal pattern.

12. The zoom device of claim 1, said optical beam axes of both of said entry light beam and said exit light beam being coincident with said optical zoom axis.

13. The zoom device of claim 1, wherein said entry light is a single entry light beam impinging on said plurality of zoom systems.

14. The zoom device of claim 1, wherein said entry light includes a plurality of individual beams impinging on respective ones of said zoom systems.

15. The zoom device of claim 8, further comprising a positive lens mounted downstream of said zoom systems.

16. The zoom device of claim 8, said exit component beams being parallel to the optical axis of said entry light beam.

17. The zoom device of claim 8, the lenses of each one of said zoom systems including a light-entry lens, an intermediate lens and a light-exit lens; said light-entry lens and said intermediate lens being positive lenses and said light-exit lens being a negative lens and said intermediate lens and said light-exit lens of each zoom system conjointly defining a lens pair whereby a plurality of lens pairs are formed in said zoom device and said lenses of selected ones of said lens pairs being movable relative to each other.

18. The zoom device of claim 11, further comprising a positive lens mounted downstream of said zoom systems.

19. The zoom device of claim 11, said exit component beams being parallel to the optical axis of said entry light beam.

20. The zoom device of claim 11, the lenses of each one of said zoom systems including a light-entry lens, an intermediate lens and a light-exit lens; said light-entry lens and said intermediate lens being positive lenses and said light-exit lens being a negative lens and said intermediate lens and said light-exit lens of each zoom system conjointly defining a lens pair whereby a plurality of lens pairs are formed in said zoom device and said lenses of selected ones of said lens pairs being movable relative to each other.

21. The zoom device of claim 6, said exit component beams being parallel to the optical axis of said entry light beam.

22. The zoom device of claim 6, the lenses of each one of said zoom systems including a light-entry lens, an intermediate lens and a light-exit lens; said light-entry lens and said intermediate lens being positive lenses and said light-exit lens being a negative lens and said intermediate lens and said light-exit lens of each zoom system conjointly defining a lens pair whereby a plurality of lens pairs are formed in said zoom device and said lenses of selected ones of said lens pairs being movable relative to each other.

* * * * *

UNITED STATES PATENT AND TRADEMARK OFFICE
CERTIFICATE OF CORRECTION

PATENT NO. : 5,850,310
DATED : December 15, 1998
INVENTOR(S) : Juergen Schweizer It is certified that error appears in the above-identified patent and that said Letters Patent is hereby corrected as shown below:

In column 1, line 16: delete "C." and substitute -- G. -- therefor.

In column 1, line 19: delete "device," and substitute -- device. -- therefor.

In column 1, line 22: delete "elements," and substitute -- elements. -- therefor.

In column 1, line 26: delete "Is" and substitute -- is -- therefor.

In column 1, line 30: delete "grown" and substitute -- Brown -- therefor.

In column 1, line 33: between "110" and "and", insert -- mm --.

In column 3, line 56: delete ")." and substitute -- ) -- therefor.

In column 4, line 19: delete "$ST_1$" and substitute -- $ST_{11}$ -- therefor.

In column 4, line 38: delete "$M_1 1$" and substitute -- $M_1,$ -- therefor.

In column 4, line 45: delete "$WN_3$" and substitute -- $W_{N3},$ -- therefor.

In column 4, line 47: delete "$WN_3$" and substitute -- $W_{N3},$ -- therefor.

UNITED STATES PATENT AND TRADEMARK OFFICE
CERTIFICATE OF CORRECTION

PATENT NO. : 5,850,310
DATED : December 15, 1998
INVENTOR(S): Juergen Schweizer

It is certified that error appears in the above-identified patent and that said Letters Patent is hereby corrected as shown below:

In column 4, line 61: delete "$Z_{21},...Z_{2N}$" and substitute -- $Z_{21},..., Z_{2N}$ -- therefor.

In column 4, line 63: delete "$Z_{11},...Z_{1N}$" and substitute -- $Z_{11},..., Z_{1N}$ -- therefor.

In column 5, line 10: delete "$Z_{11},...Z_{1N};$" and substitute -- $Z_{11},..., Z_{1N};$ -- theefor.

In column 5, line 10: delete "$Z_{31},...Z_{3N}$" and substitute -- $Z_{31},..., Z_{3N}$ -- therefor.

In column 5, line 27: delete "$Z_{21},...Z_{2N}$" and substitute -- $Z_{21},..., Z_{2N}$ -- therefor.

In column 5, line 27: delete "$Z_{31},...Z_{3N}$" and substitute -- $Z_{31},..., Z_{3N}$ -- therefor.

In column 5, line 44: delete "$Z_{13},...Z_{1N}$" and substitute -- $Z_{13},..., Z_{1N}$ -- therefor.

In column 6, line 18: delete "MA31" and substitute -- $M_{A31}$ -- therefor.

In column 9, line 35: delete "chances" and substitute -- changes -- therefor.

In column 9, line 41: delete "and" and substitute -- and, -- therefor.

In column 9, line 50: before "plurality", insert -- a --.

UNITED STATES PATENT AND TRADEMARK OFFICE
CERTIFICATE OF CORRECTION

PATENT NO. : 5,850,310
DATED : December 15, 1998
INVENTOR(S): Juergen Schweizer

It is certified that error appears in the above-identified patent and that said Letters Patent is hereby corrected as shown below:

```
    In column 9, line 61:  delete "System" and substitute
-- system -- therefor.

In column 9, line 63:  delete "beat;" and substitute
-- beam; -- therefor.
```

Signed and Sealed this

First Day of May, 2001

Attest:

NICHOLAS P. GODICI

*Attesting Officer*    *Acting Director of the United States Patent and Trademark Office*